United States Patent
Rozman et al.

(10) Patent No.: US 8,629,644 B2
(45) Date of Patent: Jan. 14, 2014

(54) FAULT TOLERANT DC POWER SYSTEMS

(75) Inventors: Gregory I. Rozman, Rockford, IL (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 322 days.

(21) Appl. No.: 12/947,247

(22) Filed: Nov. 16, 2010

(65) Prior Publication Data

US 2012/0120689 A1 May 17, 2012

(51) Int. Cl.
*H02P 1/46* (2006.01)

(52) U.S. Cl.
USPC .............................................. 318/701; 363/34

(58) Field of Classification Search
USPC ........... 363/17–20, 25, 26, 34, 39, 53, 54, 65, 363/95, 97, 98; 310/71, 45, 54, 58, 59; 318/140, 366, 371, 380, 801, 803, 807, 318/810, 727; 307/10.01, 114, 179, 66, 25
See application file for complete search history.

(56) References Cited

U.S. PATENT DOCUMENTS

| | | | | |
|---|---|---|---|---|
| 4,947,100 A * | 8/1990 | Dhyanchand et al. | .......... | 322/10 |
| 5,355,294 A | 10/1994 | De Doncker et al. | | |
| 5,714,851 A | 2/1998 | Antony et al. | | |
| 5,754,450 A * | 5/1998 | Solomon et al. | ............... | 702/35 |
| 6,198,613 B1 | 3/2001 | Rozman | | |
| 6,603,672 B1 * | 8/2003 | Deng et al. | ..................... | 363/37 |
| 6,631,080 B2 | 10/2003 | Trimble et al. | | |
| 6,665,158 B2 | 12/2003 | Walter | | |
| 6,845,020 B2 * | 1/2005 | Deng et al. | ..................... | 363/37 |
| 7,203,078 B2 | 4/2007 | Datta et al. | | |
| 7,269,039 B2 * | 9/2007 | Cheng | ............................ | 363/81 |
| 7,400,065 B2 | 7/2008 | Michalko | | |
| 7,433,216 B2 | 10/2008 | Romenesko | | |
| 7,508,086 B2 * | 3/2009 | Huang et al. | .................... | 290/31 |
| 7,605,483 B2 * | 10/2009 | Kern et al. | ..................... | 290/4 A |
| 7,615,881 B2 | 11/2009 | Halsey et al. | | |
| 7,619,327 B2 | 11/2009 | Rozman et al. | | |
| 7,683,568 B2 * | 3/2010 | Pande et al. | .................... | 318/729 |
| 7,710,081 B2 * | 5/2010 | Saban et al. | ..................... | 322/89 |
| 7,746,024 B2 | 6/2010 | Rozman et al. | | |
| 7,876,073 B2 * | 1/2011 | Sohma | .......................... | 323/222 |
| 2010/0145589 A1 | 6/2010 | Kobayashi | | |

FOREIGN PATENT DOCUMENTS

| | | |
|---|---|---|
| EP | 2106954 A2 | 10/2009 |
| JP | 11341607 A | 12/1999 |
| WO | 2012026026 A1 | 3/2012 |

OTHER PUBLICATIONS

European Search Report dated Aug. 29, 2012 for Application No. 12167403.0-1242.

* cited by examiner

*Primary Examiner* — Rajnikant Patel

(74) *Attorney, Agent, or Firm* — Cantor Colburn LLP

(57) ABSTRACT

A fault tolerant DC power system includes a permanent magnet generator (PMG), a first contactor in electrical communication with the PMG, an active rectifier in electrical communication with the first contactor, a second contactor in electrical communication with the first contactor, and a motor drive in electrical communication with the second contactor. The first contactor is configured to sever electrical communication between the PMG and the active rectifier and the second contactor is configured to establish electrical communication between the PMG and the motor drive.

11 Claims, 2 Drawing Sheets

FAULT TOLERANT DC POWER SYSTEMS

FIELD OF INVENTION

The subject matter disclosed herein relates generally to the field of power systems, and more particularly to fault tolerant high voltage direct current (DC) power systems.

DESCRIPTION OF RELATED ART

Generally, DC power systems include a generator and rectifier configured to rectify alternating current (AC) generated at the generator into DC power. Upon failure of one or more components the entire power system may fail. It follows that in applications where power systems supply power to critical components it may be desirable to increase the fault tolerance of the power systems.

BRIEF SUMMARY

According to one aspect of the invention, a fault tolerant DC power system includes a permanent magnet generator (PMG), a first contactor in electrical communication with the PMG, an active rectifier in electrical communication with the first contactor, a second contactor in electrical communication with the first contactor, and a motor drive in electrical communication with the second contactor. The first contactor is disposed to sever electrical communication between the PMG and the active rectifier and the second contactor is configured to establish electrical communication between the PMG and the motor drive.

According to another aspect of the invention, a fault tolerant DC power system includes a permanent magnet generator (PMG), an active rectifier in electrical communication with the PMG, a motor drive in electrical communication with the active rectifier, and a plurality of contactors arranged to sever electrical communication between the PMG and the active rectifier and arranged to establish electrical communication between the PMG and the motor drive in the event of a failure of at least one component of the active rectifier.

According to another aspect of the present invention, a method of controlling a fault tolerant DC power system, the DC power system including a permanent magnet generator (PMG), an active rectifier in electrical communication with the PMG, and a motor drive in electrical communication with the active rectifier, where the method includes determining an operating mode of the system, and if at least one component of the active rectifier fails, reconfiguring electrical communication of the system to bypass the active rectifier through the motor drive.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a DC power generating system are provided herein, with example embodiments being discussed below in detail.

Figure 1:
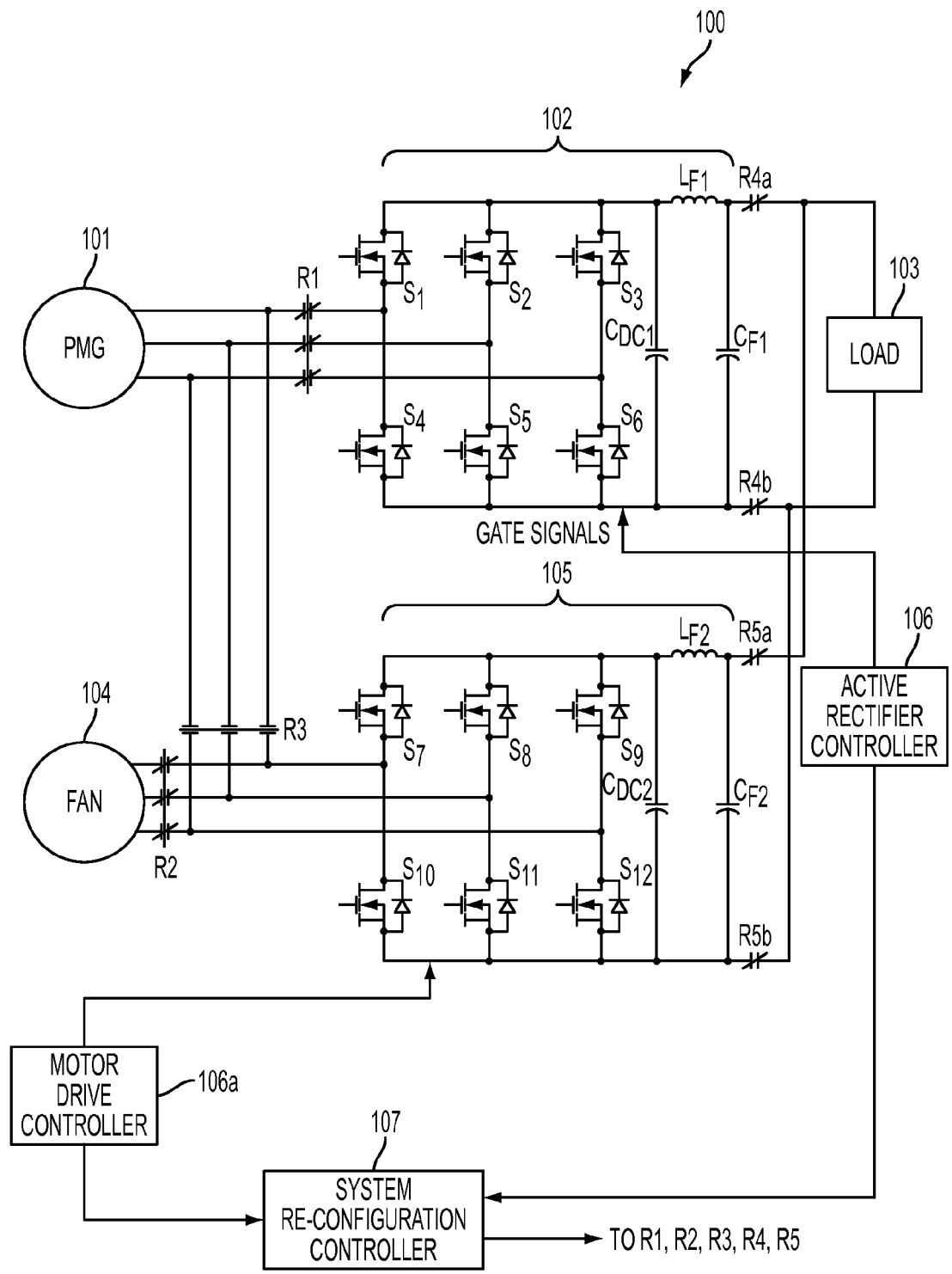
FIG. 1 illustrates a fault tolerant DC power system, according to an example embodiment.

Turning to FIG. 1, a fault tolerant DC power system 100 is illustrated. The system 100 may be a power system for a vehicle, for example a car, truck, or other ground vehicle.

The system 100 includes a permanent magnet generator (PMG) 101. The PMG 101 is coupled to an engine, turbine, or other rotating means which allows the PMG to produce alternating current. The system 100 further includes contactor R1 in communication with the PMG 101. The system 100 further includes an active rectifier 102 in electrical communication with the contactor R1. As shown, the contactor R1 is arranged between the PMG 101 and the active rectifier 102, thus contactor R1 may open/close an electrical connection between PMG 101 and active rectifier 102.

The active rectifier 102 may include a plurality of switches $S_1$-$S_6$ arranged in electrical communication with the contactor R1. The switches $S_1$-$S_6$ form DC output rails of the active rectifier 102. The active rectifier 102 may further include DC coupling capacitor $C_{DC1}$ arranged in parallel electrical communication with outputs of the switches $S_1$-$S_6$. The active rectifier 102 further includes filter inductance $L_{F1}$ arranged serially on a first rail of the DC output rails, and filter capacitor $C_{F1}$ arranged in parallel across the inductance $L_{F1}$ and a second rail of the DC output rails.

The system 100 further includes contactor R4 in communication with the active rectifier 102. As illustrated, R4 includes contacts R4a in communication with the first rail of the DC output rails, and contacts R4b in communication with the second rail of the DC output rails. The system 100 further includes load 103 in communication with the contactor R4. As arranged, contactor R4 may open/close an electrical connection between the active rectifier 102 and the load 103.

As further illustrated in FIG. 1, the system 100 may include fan 104 in communication with contactor R2, in further communication with a motor drive 105. The motor drive 105 may be any suitable motor drive configured to power motor driven loads such as fan 104. Further, the motor drive 105 may be arranged with internal components that are arranged similar to an active rectifier. For example, the active rectifier 102 and the illustrated portions of the motor drive 105 are somewhat similar. For example, the motor drive 105 includes switches $S_7$-$S_{12}$, a coupling capacitor $C_{DC2}$, a filter inductance $L_{F2}$, and a filter capacitor $C_{F2}$. Therefore, redundant discussion of the components of the motor drive 105 is omitted herein for the sake of brevity.

As illustrated, the system 100 also includes contactor R3 in communication with PMG 101, contactor R1, contactor R2, and the motor drive 105. As arranged, the contactor R3 may open/close an electrical connection between PMG 101 and the motor drive 105, and/or open/close an electrical connection between contactor R2 and contactor R1. As further illustrated, system 100 includes contactor R5 arranged between the motor drive 105 and the load 103. Thus, the contactor R5 may open/close an electrical connection between the motor drive 105 and the load 103.

As described above, the system 100 includes two power converters (e.g., the active rectifier 102 and the motor drive 105), both in electrical communication with the PMG 101 and load 103. According to example embodiments, in the event of component failure in any portion of the system 100, the contactors R1-R5 may be configured to open/close electrical connections thereby reconfiguring the system 100 and bypassing failed components and tolerating an increased number of faults compared to conventional systems. The opening/closing of contactors R1-R5 is controlled by the system re-configuration controller 107. The system re-configuration controller is in communication with active rectifier controller 106, and motor drive controller 106a. The active rectifier controller provides gate signals to control active rectifier 102. The motor drive controller is configured to control gate drives of motor controller 105.

It should be understood that there may be additional monitoring connections within the system 100, which have been omitted from this illustration for clarity. For example, one or more of the controllers 105-107 may receive and/or provide voltage/current feedback from/to any component in the system 100, and additional connections to facilitate operation may exist according to any desired implementation. Therefore, example embodiments should not be limited according to the particular form illustrated.

Hereinafter an example methodology describing the reconfiguration of the system 100 is provided in detail.

Figure 2:
FIG. 2 illustrates a method of controlling a fault tolerant DC power system, according to an example embodiment.
Figure 2:

Turning to FIG. 2, a method 200 of controlling a fault tolerant DC power system is illustrated. The method 200 includes determining an operating mode of the DC power system 100. For example, the operating mode may be one of at least four (4) different operating modes. The at least four operating modes may include a normal operating mode, a motor drive fail operating mode, an active rectifier fail operating mode, and a PMG fail operating mode. The system re-configuration controller 107 is configured to collect status information about the PMG 101, fan 104, load 103, active rectification (102, 105) and fan motor drive (e.g., for fan 104). The status information about the PMG 101, load 103, and active rectification (102, 105) is provided by the active rectifier controller 106. The status information about the fan 104, dc bus outputs (e.g., at 102, 105), and fan motor drive (e.g., for fan 104) is provided by the motor drive controller 105. The failure mode in the specified above components is derived by monitoring components' internal temperature, power quality on dc bus by use of dc bus voltage and current sensors, PMG and fan stator currents, and/or load current. The predictive health monitoring/prognostics may also be used in determining system re-configuration such that the system re-configuration controller 107 may open/close contactors R1-R5 according to the at least for operating modes described in detail below.

The normal operating mode is a mode where there are ideally no faults (or at least partially functioning components) in the system 100. In normal operating mode, the active rectifier 102 powers the load 103, and the rectifier/motor drive 105 powers the fan 104.

The motor drive fail operating mode is a mode where the motor drive 105, or a portion thereof, fails.

The active rectifier fail operating mode is a mode where the active rectifier 102, or a portion thereof, fails.

The PMG fail operating mode is a mode where the PMG 101 fails.

According to the particular mode determined at block 201, the system 100 may be reconfigured to overcome the fault through application of signals to the contactors R1-R5 by the system re-configuration controller 107, at outlined in Table 1, below:

TABLE 1

| Operating Mode | R1 | R2 | R3 | R4 | R5 |
| --- | --- | --- | --- | --- | --- |
| Normal | Closed | Closed | Open | Closed | Closed |
| Motor Drive Fail | Closed | Open | Open | Closed | Open |
| Active Rectifier Fail | Open | Open | Closed | Open | Closed |
| PMG Fail | Open | Open | Open | Open | Open |

As set forth in Table 1, the contact position for each of the contactors R1-R5 is determined by an operating mode of the system 100. During normal operation, contactors R1-R2 are closed, contactor R3 is open, and contactors R4-R5 are closed. In the event of a motor drive fail, contactors R2 and R5 open to sever power from the fan 104. It is noted that as contactors R2 and R5 are open, the fan 104 is not powered. However, the fan 104 is not considered a critical load/component of the system 100, insofar as operation of more critical loads (e.g., load 103) may be preferred.

In the event of an active rectifier fail, contactor R3 is closed and contactors R1-R2 and R4 are opened to bypass active rectifier 102, sever power from the fan 104, and allow the motor drive 105 to assume the responsibility of rectifying power from the PMG 101.

In the event of a PMG fail, all of contactors R1-R5 open, thereby severing power from all components.

Thus, as described above, example embodiments include fault tolerant DC power systems and methods of controlling the same. Depending upon an operating mode of the DC power system, contactors are opened/closed to reconfigure power distribution/bypass failed components. As will be readily appreciated by one of ordinary skill in the art, the addition of the contactors allows for fault tolerance while reducing weight, cost, and complexity of redundant or extra rectification systems. Therefore, technical effects and benefits of example embodiments include fault tolerant operation of DC power systems and decreased weight through dual-use of active rectifiers and motor drives of the DC power system.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:
1. A fault tolerant DC power system, comprising:
a permanent magnet generator (PMG);
a first contactor in electrical communication with the PMG;
an active rectifier in electrical communication with the first contactor;
a second contactor in electrical communication with the first contactor;
a motor drive in electrical communication with the second contactor;
a third contactor in electrical communication with the active rectifier;
a load in electrical communication with the third contactor; and
a fourth contactor in electrical communication with the motor drive and the load;
wherein the first contactor is configured to sever electrical communication between the PMG and the active rectifier and the second contactor is configured to establish electrical communication between the PMG and the motor drive; and
wherein the third contactor is configured to sever electrical communication between the active rectifier and the load, and the fourth contactor is configured to establish electrical communication between the motor drive and the load.

2. The system of claim 1, wherein the motor drive includes an active rectifier arranged therein.

3. The system of claim 1, further comprising:
a fifth contactor in electrical communication with the motor drive; and
a non-critical load in electrical communication with the fifth contactor.

4. The system of claim 3, wherein the fifth contactor is configured to sever electrical communication between the non-critical load and the motor drive.

5. The system of claim 3, wherein, in the event of a failure of at least one component of the active rectifier, the first contactor, the second contactor, the third contactor, the fourth contactor, and the fifth contactor are configured to bypass power generated at the PMG from the active rectifier and establish electrical communication between the PMG and the load through the motor drive.

6. The system of claim 5, wherein, in the event of the failure of the at least one component of the active rectifier, the first contactor, the second contactor, the third contactor, the fourth contactor, and the fifth contactor are further configured to sever communication between the non-critical load and the motor drive.

7. A fault tolerant DC power system, comprising:
a permanent magnet generator (PMG);
an active rectifier in electrical communication with the PMG;
a motor drive in electrical communication with the active rectifier;
a plurality of contactors arranged to sever electrical communication between the PMG and the active rectifier and arranged to establish electrical communication between the PMG and the motor drive in the event of a failure of at least one component of the active rectifier;
a load in electrical communication with the active rectifier and the motor drive;
a second plurality of contactors arranged to sever electrical communication between the active rectifier and the load in the event of the failure of the at least one component of the active rectifier; and
a third plurality of contactors arranged to establish electrical communication between the motor drive and the load.

8. The system of claim 7, further comprising a non-critical load in electrical communication with the motor drive, wherein the plurality of contactors are further arranged to sever electrical communication between the non-critical load and the motor drive in the event of the failure of the at least one component of the active rectifier.

9. A method of controlling a fault tolerant DC power system, the DC power system including a permanent magnet generator (PMG), an active rectifier in electrical communication with the PMG, a motor drive in electrical communication with the active rectifier, and a load in electrical communication with the active rectifier, the method comprising:
determining an operating mode of the system; and
if at least one component of the active rectifier fails, reconfiguring electrical communication of the system to bypass the active rectifier through the motor drive and establishing electrical communication between the PMG and the load through the motor drive.

10. The method of claim 9, wherein reconfiguring includes severing electrical communication between the PMG and the active rectifier, and establishing electrical communication between the PMG and the motor drive.

11. The method of claim 9, wherein the system further includes a non-critical load in electrical communication with the motor drive, and the method further comprises, if the at least one component of the active rectifier fails, severing electrical communication between the non-critical load and the motor drive.

* * * * *